July 31, 1945.   R. R. EASTIN   2,380,734
HYDRAULIC TRANSMISSION
Filed Dec. 16, 1941   3 Sheets-Sheet 1

INVENTOR.
ROLLIE R. EASTIN
BY Thos L Donnelly
Attorney

INVENTOR.
ROLLIE R. EASTIN

Patented July 31, 1945

2,380,734

UNITED STATES PATENT OFFICE 2,380,734

HYDRAULIC TRANSMISSION

Rollie R. Eastin, Detroit, Mich., assignor to John W. Hurley, Detroit, Mich., as trustee Application December 16, 1941, Serial No. 423,192

3 Claims. (Cl. 192—3.2)

My invention relates to a new and useful improvement in a hydraulic transmission and is intended as a means for hydraulically transmitting power from a driving shaft to a driven shaft.

It is an object of the present invention to provide a structure of this type which will be compact, light, durable, easily and quickly installed and highly efficient in use. Another object of the invention is the provision of a centrally positioned splasher member rotating in unison with the driving shaft and having vanes on its opposite faces for cooperating with a vane bearing member having its vanes on opposite sides and connected to a driven shaft.

It is another object of the present invention to provide a splasher member formed in segments and so arranged that upon attaining a predetermined speed the splasher member will automatically move into frictional engagement with the driven clutch section and serve to drive it in unison with the driving shaft.

Another object of the invention is the provision in a hydraulic mechanism of this type of a brake structure whereby the mechanism may be utilized for braking purposes.

Other objects will appear hereinafter. It is recognized that various changes and modifications may be made in the detail of structure shown without departing from the spirit of the invention and it is intended that such changes and variations shall be embraced within the scope of the claims which form a part hereof.

Forming a part of this specification are drawings in which.

Figure 1:
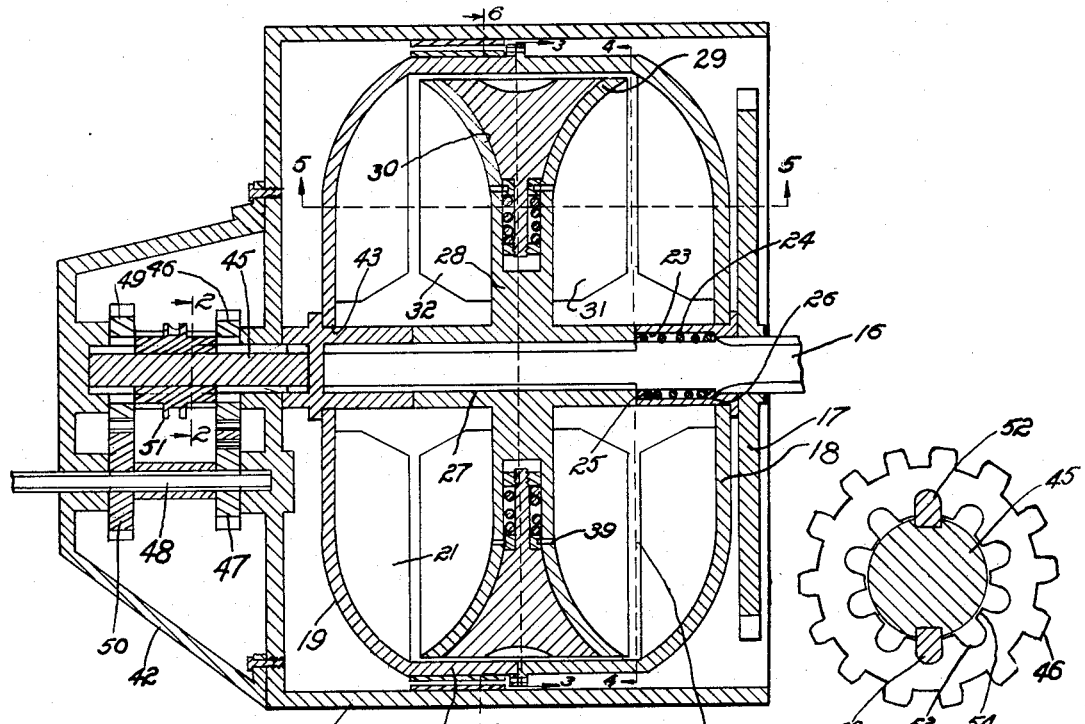
Fig. 1 is a longitudinal, central, vertical, sectional view of the invention.
Figure 2:
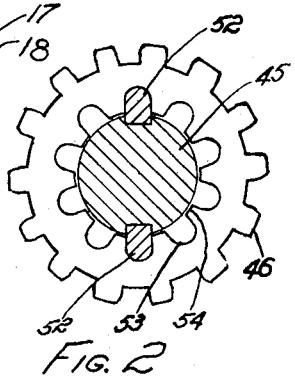
Fig. 2 is a slightly enlarged sectional view taken on line 2—2 of Fig. 1.
Figure 3:
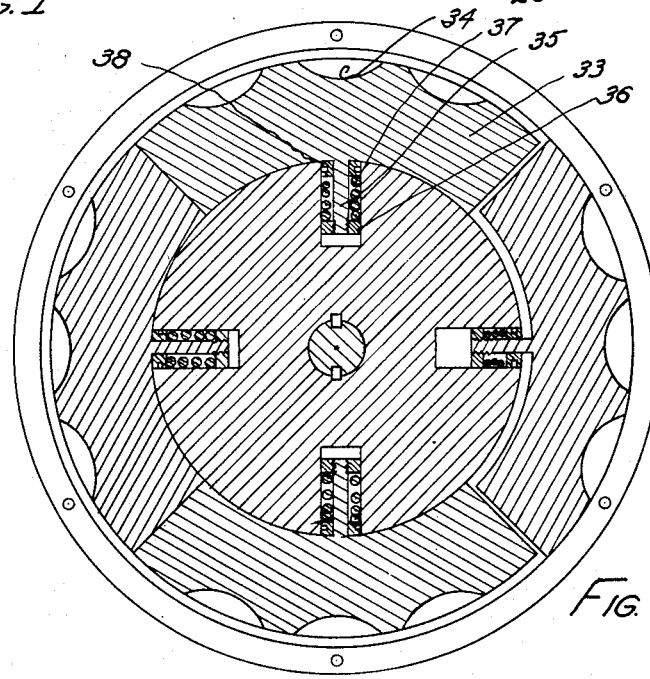
Fig. 3 is a sectional view taken on line 3—3 of Fig. 1.
Figure 4:
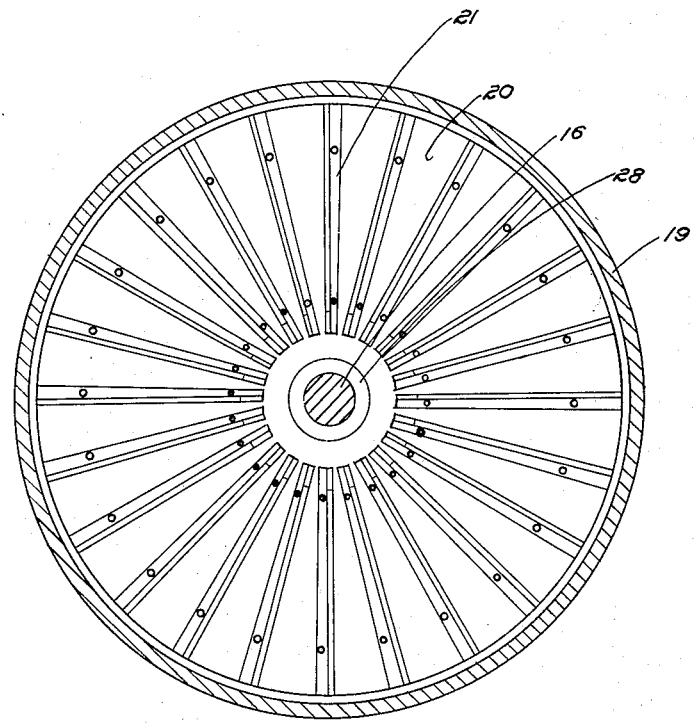
Fig. 4 is a sectional view taken on line 4—4 of Fig. 1.
Figure 5:
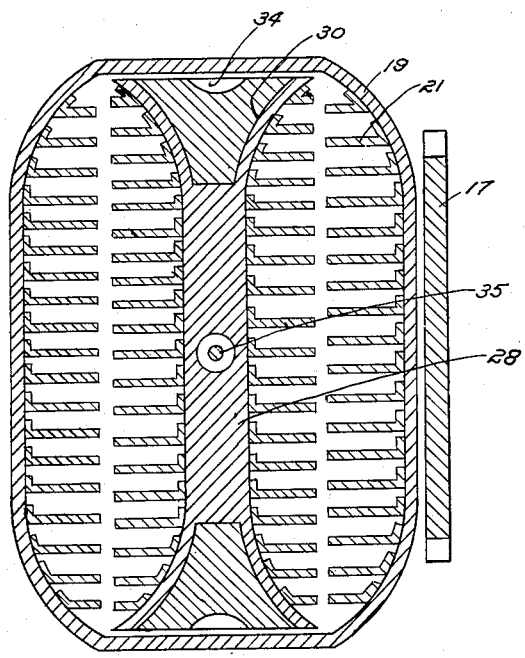
Fig. 5 is a sectional view taken on line 5—5 of Fig. 1.

The invention is adapted for use primarily with internal combustion engines with which a drive shaft is utilized. This drive shaft usually carries a fly wheel and by the use of the present invention the fly wheel may be dispensed with as parts of the invention itself will function as a fly wheel. It will also appear that the use of a clutch such as is ordinarily used on an automobile is eliminated, the present invention serving as a clutch.

With the present invention also, the usual type of gearing used in a transmission box is eliminated and this also will appear as the description of the invention proceeds. In the drawings I have illustrated the invention housed in a housing 15 which is mounted stationary on any suitable part of the engine. Projecting into this housing is the drive shaft 16 which is rotated by the engine and on which is fixedly mounted the starter gear 17. Positioned within the housing 15 is a container embodying the side walls 18 and 19. Projecting inwardly from the inner face of each of these side walls 18 and 19 are radially directed blades or vanes 20 and 21 respectively. A circular wall portion 22 lies between the side walls 18 and 19. The shaft 16 projects through a tubular fitting 23 which is fixedly mounted on and rotates with the end wall 18. Positioned in this tubular fitting 23 is a spring 24 having, at its opposite ends, the sealing links 25 and 26 which serve as a seal for preventing leakage of oil.

The shaft 16 projects through the hub 27 formed on the splasher wheel 28 which is flared at its periphery as at 29 and provided with a channel 30. Projecting outwardly from one face of the wheel 28 are the radially directed vanes or blades 31 and projecting outwardly from the opposite face of the wheel 28 are the radially directed blades or vanes 32. As shown the container is formed in two sections, 18 and 19, these sections being suitably bolted together.

Positioned in the channel or groove 30 are the presser segments 33 each of which has an arcuate periphery provided with spaced apart pockets 34. A radially projecting stem 35 extends inwardly from each of the segments 33. This stem is provided with a nut 36 threaded on its inner end which serves to engage one end of a spring 37, the opposite end of which engages a washer 38. Held in fixed relation to the wheel 28 lie pins 39 extending into pockets formed in the washer 38. The construction is such that when the segment 33 moves radially outwardly it does so against the compression of the spring 37 so that the spring serves to normally retain the segmental portions in a position spaced from the inner surface of the cylindrical part 22 of the drum like structure.

The hub 27 is suitably keyed to the shaft 16 so as to rotate therewith while the drum like container is rotatable on the shaft 16. It will be noted that the vanes or blades 32 are oppositely disposed to the blades 21 and spaced therefrom at adjacent edges. Likewise, the vanes or blades 31 are oppositely faced to the vanes or blades 20 and spaced therefrom at adjacent edges.

Mounted on the housing 15 is an auxiliary housing 42 which serves to engage a set of gearing. The drum like container is provided on the wall 19 with a hub 43 which is fixed to this drum like container and rotates in unison therewith. Keyed to a portion of the hub 43 is a stub shaft 45 on which is rotatably mounted a gear 46 meshing with a gear 47 fixedly mounted on the driven shaft 48. Rotatably mounted on the stub shaft 45 is a gear 49 meshing with a gear 50 fixedly mounted on the driven shaft 48.

Slidably mounted on the stub shaft 45 between the gears 46 and 49 is a shiftable collar 51 which may be shifted by any suitable mechanism. This collar 51 carries a pair of radially directed ribs 52 which may be shifted into position for engaging in the spaces 53 between the internal teeth 54 of the gear 46, this gearing being an internal gear and an external gear. The gear 49 is similarly constructed so that when the collar 51 is shifted in one direction the ribs 52 will engage the internal teeth of the gear 46 and when shifted in the opposite direction, will engage the internal teeth of the gear 49. The gear 46 engages an idler gear and this idler gear is in engagement with the gear 57 so that when shifting the collar to one side or the other a reverse rotation of the driven shaft 48 may be effected. It is, of course, believed obvious that the ratio between the various gears may be such as desired and determined upon.

In operation when the engine is operated and the shaft 16 rotated, the wheel 28 will be rotated. The container will, of course, be filled with liquid. As the wheel 28 rotates the vanes or blades 31 and 32 will cause the liquid to be driven and through the engagement of the liquid with the blades 20 and 21 the drum like container embodying the walls 18 and 19 will be caused to rotate. It will be noted that the structure is of a dual nature as the member 28 vertically divides the container into a pair of separate and separately operating compartments. It is believed obvious that were it desired to make the container larger and place a plurality of wheels 28 on the shaft 16, this could be accomplished so that the structure may be mounted in units of any desired number. As the walls 18 and 19 begin to rotate the stub shaft 45 will be rotated and through the gear described the driven shaft 48 will be caused to rotate. This shaft 48 may be connected to any suitable mechanism which it is desired to operate. Experience has shown that the method of transmission described is one in which a minimum loss of power is met in the transmission and a high efficient in transmitting power from a driving gear to a driven gear is obtained.

Figure 6:
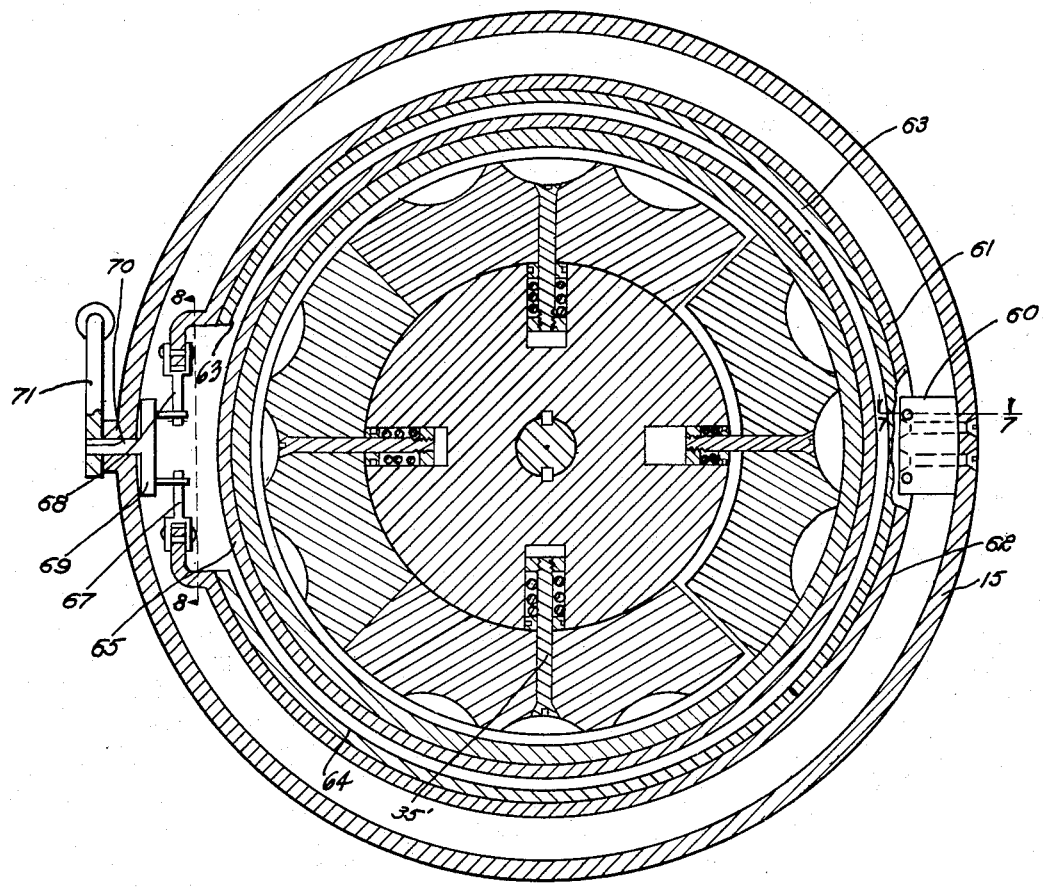
Fig. 6 is a sectional view taken on line 6—6 of Fig. 1, showing a slightly modified form with parts broken away and parts shown in side elevation.
Figure 7:
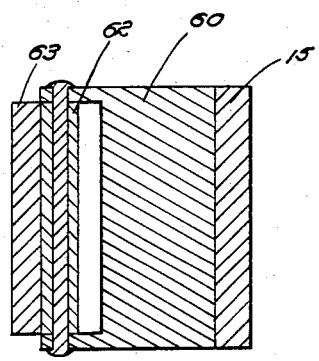
Fig. 7 is a sectional view taken on line 7—7 of Fig. 6.
Figure 8:
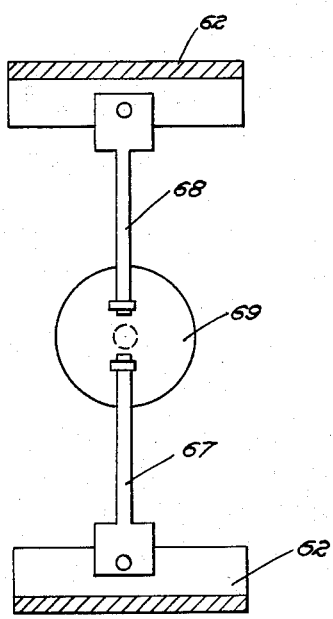
Fig. 8 is an elevational view taken on line 8—8 of Fig. 6.

In the form shown in Fig. 6 the stems 35 have been replaced by bolts 35' which are projected through the segments, the construction operating otherwise in the same manner as described.

Projecting inwardly from the wall of the housing 15 is a bracket 60 to which is attached one end of the brake arms 61 and 62 each being provided on its inner face with the brake linings 63 and 64 respectively. Mounted on the wall 22 of the brake like structure is a covering 65 of brake lining against which the brake linings 63 and 64 may be brought into engagement. Links 67 and 68 serve to connect the ends of the arms 62 and 61 eccentrically to the disc 69 which is provided with the shaft 70 on which the disc 69 rotates on its center, this rotation being effected by the rocking of the arm 71. By rocking the arm 71 the arms may be brought into approach so that the brake linings 63 and 64 will engage the covering of brake lining 65 and thus serve to brake or retard the rotation of the drum like structures. This makes it possible to bring the structure to a stationary position when it is desired to shift the collar 51 from forward to reverse position.

When the drive shaft 16 rotates at a predetermined speed the segment portions 33 will move outwardly and frictionally engage the inner surface of the portion 22 so that the drum is driven in unison with the wheel 28. In this way there is provided a direct drive. The pockets 34 may serve as vacuum cups to facilitate the gripping between the wheel 28 and drum portion 22 or, if desired, these pockets may be filled with a suitable friction material such as ground cork or the like.

With the drive mechanism such as I have illustrated the various advantages are obtained. Compactness, power and economy in operation is effected and a structure which is easily and quickly assembled and formed in a durable and rugged manner provided.

What I claim is:

1. A hydraulic transmission of the class described, comprising; a driving shaft; a liquid receiving housing having oppositely disposed walls and rotatably mounted on said shaft; a plurality of radially directed spaced vanes projecting inwardly from the inner face of said walls; an agitator mounted on said shaft for rotation in unison therewith; a plurality of spaced radially directed vanes projecting outwardly from opposite faces of said agitator and terminating in spaced relation to opposed vanes on said walls; the periphery of said agitator being grooved to form a channel; a plurality of radially movable segments positioned in and filling said channel and, movable radially outwardly, upon the rotation of said agitator at a predetermined speed, into engagement with the inner surface of said housing for effecting a rotating of said housing in unison with said agitator.

2. A hydraulic transmission of the class described comprising; a driving shaft; a liquid receiving housing having oppositely disposed walls and rotatably mounted on said shaft; a plurality of radially directed spaced vanes projecting inwardly from the inner face of said walls; an agitator mounted on said shaft for rotation in unison therewith; a plurality of spaced radially directed vanes projecting outwardly from opposite faces of said agitator and terminating in spaced relation to opposed vanes on said walls; the periphery of said agitator being grooved to form a channel; a plurality of radially movable segments positioned in and filling said channel and, movable radially outwardly, upon the rotation of said agitator at a predetermined speed, into engagement with the inner surface of said housing for effecting a rotation of said housing in unison with said agitator, and resilient means for resisting radial outward movement of said segments.

3. A hydraulic transmission of the class described, comprising: a driving shaft; a liquid receiving housing having oppositely disposed walls and rotatably mounted on said shaft; a plurality of radially directed spaced vanes projecting inwardly from the inner face of said walls; an agitator mounted on said shaft for rotation in unison therewith; a plurality of spaced radially directed vanes projecting outwardly from opposite faces of said agitator and terminating in spaced relation to the vanes on said walls; a circular structure embodying a plurality of radially movable segments mounted on said agitator in embracing relation and movable independently radially outwardly, upon the rotation of said agitator at a predetermined speed, into engagement with the inner surface of said housing for effecting a rotation of said housing in unison with said agitator; and resilient means for resisting radial outward movement of said segments.

ROLLIE R. EASTIN.